Figure 1:
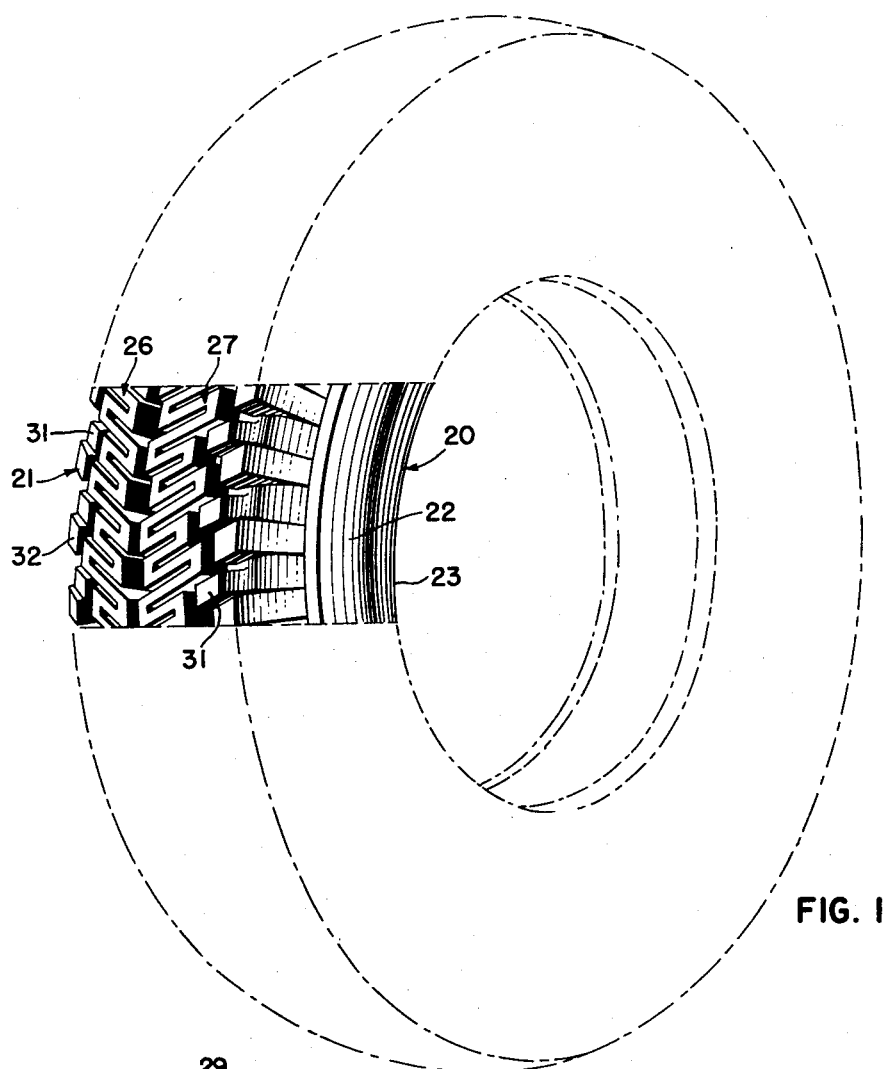

July 31, 1956    A. J. PALKO ET AL    2,756,798
TIRE TREAD
Original Filed Sept. 28, 1951

*INVENTOR.*
ANDREW J. PALKO
BY WALTER E. SHIVELY

*R. L. Miller*
ATTORNEY

United States Patent Office 2,756,798
Patented July 31, 1956

2,756,798

TIRE TREAD

Andrew J. Palko and Walter E. Shively, Akron, Ohio, assignors, by mesne assignments, to The Goodyear Tire & Rubber Company, a corporation of Ohio Original application September 28, 1951, Serial No. 248,822, now Patent No. 2,642,914, dated June 23, 1953. Divided and this application June 2, 1953, Serial No. 359,087

2 Claims. (Cl. 152—209)

The present invention is a division of application Serial No. 248,882 for Tire, filed September 28, 1951, now Patent 2,642,914, and relates to a novel form of pneumatic, semi-pneumatic, or solid rubber tire. More particularly the invention pertains to a tread pattern for use on the tread portion of a tire to provide improved traction, especially when snow and ice are prevalent on the highway or terrain to be traversed by the vehicle.

It is the principal object of the invention to impart to a tire improved traction and non-skid properties in the tread portion thereof without sacrificing good wearing qualities.

It is a further object of the invention to provide a tire tread pattern which, while it possesses improved non-skid properties, will also have the desired lateral stability to resist side slipping.

Other important objects and advantages of the invention will become apparent from the following description of a tire embodying the teachings of the invention and illustrated in the accompanying drawings.

Figure 2:
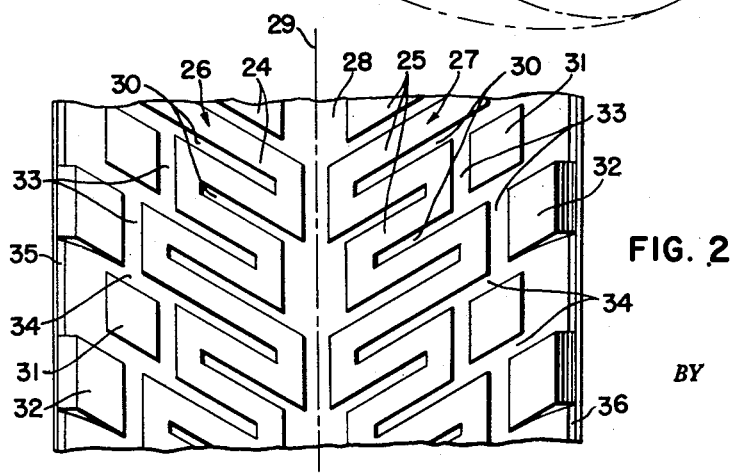

In the drawings:

Fig. 1 is a partial perspective of a form of pneumatic tire embodying the teachings of the invention; and Fig. 2 is a large-scale plan view embodying a flat development or imprint of a part of the tread portion of the tire of Fig. 1.

It will be apparent from an inspection of the tire 20 that it has a tread portion 21, sidewall portions 22, and inextensible beads 23, that the lugs or lug portions 24 and 25 may be advantageously joined together to form the sinuous ribs 26 and 27, respectively. The ribs 26 and 27 embodying the connected lugs 24 and 25, disposed in inclined mutually parallel relation, are continuous circumferentially of the tire 20 and are separated by the groove 28 disposed substantially on the circumferential line 29 of the tire (see Fig. 2). The ribs 26 and 27 are mirror images of each other.

The lug portions 24 and 25 of the ribs 26 and 27, respectively, are afforded some added degree of flexibility in a circumferential direction through the use of the molded inclined slots 30 which extend part way into the lugs from the groove 28 and away from the groove. This arrangement provides ribs extending circumferentially in a sinuous manner with portions thereof extending parallel to the center line of the tire joining the angularly arranged portions extending at a substantial angle to the center line but at less than 90° thereto. As will be apparent from Fig. 2, embossed portions 31 and 32 are disposed in staggered relation, being separated from the outermost extremities of the lug portions 24 and 25 of the ribs 26 and 27, respectively, by the auxiliary grooves 33. The embossed portions 31 and 32 are separated from each other and from the lug portions 24 and 25 by the grooves 34. By virtue of their staggered or offset arrangement at the shoulder portions 35 and 36 of the tire 20, the embossed portions 31 and 32 provide a cogged or cleated effect.

The tire 20 possesses many distinct advantages. The center groove 28 guards against side slipping, while the offset and inclined relationship of the alternately arranged lug portions 24 and 25, by reason of which the innermost ends of said lug portions project into the annular groove 34, insures a maximum traction in snow-covered terrain.

It is important in the design of the tire that the optimum degree of inclination of the lug portions 24, 25 be carefully predetermined to insure maximum traction, minimum wear, and some degree of self-cleaning ability. Experience has clearly demonstrated that a tire tread portion having a large number of lugs extending transversely across or normal to the great circle of the tire will give good traction, but has poor wearing qualities. Similarly, a tire tread portion in which the lugs are disposed at a rather small degree of angularity approaching a parallel relation to the great circle of the tire will possess excellent wearing qualities, but will give poor traction in snow and ice.

The circumferentially successive lug portions 24, 25 in the same ribs have their inner ends staggered with respect to each other so that opposed pairs project different distances into groove 28. Such an arrangement provides greater traction in snow because the snow, penetrating into the spaces between the more widely spaced pairs, may be engaged by the projecting ends of the more closely spaced pairs to afford traction, while the generally narrow circumferential spacing between the lug portions provides a great number of gripping edges peripherally of the tire to give good traction particularly on ice and slippery roads. The embossed portions 31, 32 also give good traction because they are likewise staggered with respect to each other.

It will be noted that the lug portions 24, 25 and the embossed portions 31 and 32 are arranged preferably in repetitive sequence circumferentially of the tread and the main body portion of the lug and embossed portions at their adjacent areas are more closely spaced than the width of these portions in a circumferential direction.

Thus, the primary purpose of the present invention is achieved in the tread portion 21 of tire 20, by incorporating therein numerous laterally offset circumferentially flexible elements or lugs arranged at a predetermined angle of approximately 50 to 75 degrees to the circumferential line of the tire. The circumferential flexibility of the lug portions 24, 25 of the tire 20 is obtained by establishing the proper predetermined proportion of the width of the element to its vertical dimension. Obviously, this ratio will change as the tire wears, but it is desirable to select a width $w$ and vertical dimension $h$ such that the quotient of $w/h$ will closely approximate 1 throughout the major portion of the effective operating life of the tire.

The optimum results are obtained with a tire tread portion in which the lugs are disposed at an angle of approximately 60 degrees with respect to the circumferential line of the tire. Moreover, when the tire is new, the width $w$ of the lug should be about three-eighths to one-half inch with a vertical dimension $h$ of approximately nine-sixteenths inch. As the tire wears $h$ will gradually be reduced to approximate the original $w$ dimension and the ratio $w/h$ will vary from about 0.75 to about 1.5. When the latter condition is reached, the circumferential flexibility of the lugs and their effectiveness will be materially reduced.

As used in the claims the term "circumferential line of the tread" means a line lying in a plane normal to the axis through the center of the tire and intersecting the tread. The term "laterally" refers to a direction perpendicular to the circumferential line and parallel to the axis of the tire, and the term "lateral edge" means the edge lying at the extreme outer edge of the tread adjacent the sidewall of the tire. The term "successive pairs" refers to the grouping of the lugs two at a time in a peripheral direction to form in effect a single traction element. This is for the purpose of simplifying the language of the claims.

While a certain embodiment and details thereof have been shown for the purpose of illustrating the invention, it will be apparent to those skilled in this art that various changes and modifications may be made therein without departing from the spirit or scope of the invention.

Having thus fully described this invention, what we claim and desire to secure by Letters Patent of the United States is:

1. A tire comprising a tread including at least a pair of spaced ribs extending generally circumferentially of the tire, one of said ribs being arranged wholly on one side and another on the other side of the circumferential line of the tread and each rib comprising a series of elongated lugs arranged substantially parallel to each other with their longest dimension inclined at a substantial acute angle to the circumferential line of the tread but substantially less than 90°, the adjacent lugs in each rib being spaced from each other circumferentially less than their width in a circumferential direction with successive pairs of lugs in the series having their inner ends joined to each other circumferentially and having their outer ends joined to adjacent lugs of adjacent pairs whereby to form a sinuous rib, the joined inner ends of the lugs of certain pairs lying closer to said circumferential line than the joined inner ends of an adjacent pair, and in which the joined outer ends of the lugs are staggered with respect to each other laterally of the tread, said tread including two series of embossed portions which series are arranged, one near each lateral edge of the tread, the embossed portions being arranged, one at each end of the joined outer ends of the lugs and each having substantially the same spacing from said joined outer ends whereby the inner ends of the embossed portions are staggered in the same manner with respect to each other as the adjacent joined outer ends of the lugs.

2. A tire comprising a tread including at least a pair of spaced ribs extending generally circumferentially of the tire, one of said ribs being arranged wholly on one side and another on the other side of the circumferential line of the tread and each rib comprising a series of elongated lugs arranged substantially parallel to each other with their longest dimension inclined at a substantial acute angle to the circumferential line of the tread but substantially less than 90°, the adjacent lugs in each rib being spaced from each other circumferentially less than their width in a circumferential direction with successive pairs of lugs in the series having their inner ends joined to each other circumferentially and having their outer ends joined to adjacent lugs of adjacent pairs whereby to form a sinuous rib, the joined inner ends of the lugs of certain pairs lying closer to said circumferential line than the joined inner ends of an adjacent pair, and in which the joined outer ends of the lugs are staggered with respect to each other laterally of the tread, said tread including two series of embossed portions which series are arranged, one near each lateral edge of the tread, the embossed portions being of substantially the same length laterally of the tread and arranged, one at each end of the joined outer ends of the lugs and each having substantially the same spacing from said joined outer ends whereby the embossed portions are staggered in the same manner with respect to each other as the adjacent joined outer ends of the lugs.

References Cited in the file of this patent

UNITED STATES PATENTS

| D. 73,004 | Mann | July 5, 1927 |
| D. 155,006 | Grimes | Aug. 30, 1949 |
| D. 155,311 | Offensend | Sept. 20, 1949 |
| 1,182,634 | Buckley | May 9, 1916 |
| 2,592,557 | Gibbs | Apr. 15, 1952 |

FOREIGN PATENTS

| 136,076 | Austria | Dec. 27, 1933 |
| 351,784 | Great Britain | July 2, 1931 |